United States Patent [19]

Maruscak et al.

[11] Patent Number: 5,038,775
[45] Date of Patent: Aug. 13, 1991

[54] PLASTIC SCRIM

[75] Inventors: John Maruscak, Athens; Pierre Legare, Brockville, both of Canada; Thomas C. Welch, Jr., Homer, N.Y.

[73] Assignee: Her Majesty the Queen in right of Canada as 050390152represented by The Minister of National Defence of Canadian Government

[21] Appl. No.: 140,677

[22] Filed: Jan. 4, 1988

[51] Int. Cl.$^5$ ............................................. A62B 7/10
[52] U.S. Cl. ........................... 128/205.27; 128/205.29; 128/206.16
[58] Field of Search .............. 128/206.16, 206.19, 128/206.17, 205.29, 205.27; 55/524

[56] References Cited

U.S. PATENT DOCUMENTS

| 2,201,315 | 5/1940 | Lehmberg | 128/206.16 |
| 2,269,461 | 1/1942 | Lehmberg | 128/206.17 |
| 3,944,403 | 3/1976 | Simpson et al. | 128/206.17 |
| 4,084,949 | 4/1978 | Biggins | 55/524 |
| 4,508,113 | 4/1985 | Malaney | 128/206.19 |
| 4,548,626 | 10/1985 | Ackley et al. | 128/206.17 |
| 4,643,182 | 2/1987 | Klein | 128/206.19 |
| 4,714,486 | 12/1987 | Silverthorn | 128/206.17 |

FOREIGN PATENT DOCUMENTS 749284  5/1933  France ........................ 128/206.17

Primary Examiner—Edgar S. Burr
Assistant Examiner—Aaron J. Lewis
Attorney, Agent, or Firm—Nixon & Vanderhye

[57] ABSTRACT

The invention disclosed is an improved scrim means for use in a breathing gas filter assembly which includes a pleated web filter medium. The improved scrim means is of a non-woven microorganism resistant synthetic polymeric material of sufficient rigidity to provide substantially continuous support to maintain the pleats of the filter medium in substantially uniformly spaced relationship, to expedite fluid flow in the plane of the web and to minimize nesting of the filter medium.

12 Claims, 3 Drawing Sheets

PLASTIC SCRIM

The present invention relates to breathing gas filter systems for removing undesirable substances from a breathing gas, and in particular to an improved filter means capable of removing particulate and liquid aerosol contaminants from a breathing gas, i.e. an oxygen-containing gas capable of supporting life.

In a variety of military and industrial settings a person may require a gas mask when in an environment of highly toxic airborne contaminants, including particulate, aerosol and vaporous chemical and biological contaminants. The gas mask commonly includes a face cover and a breathing gas filter assembly attached thereto.

Typical breathing gas filter assemblies contain two primary filter means. A first filter means includes a filter medium for removal of particulate and liquid aerosol contaminants from the breathing gas, followed by a second filter means including a sorbent material for removing chemical contaminants present as vapours or in the gaseous state. The present invention is concerned with improvement of the first filter means.

Filter means of this type normally include a porous filter medium, such as glass fibres, other inert fibres or a combination thereof, in the form of a web. Commonly, the filter medium is in a pleared form in order to provide maximum possible surface area and filtration efficiency in a given space envelope When such a configuration is employed, the filter means may also include scrim means, i.e. layers of material both at the upstream and downstream surfaces of the filter medium to provide support for the filter medium which may, in some instances, be of a material not capable of self- support. The scrim means is also intended to optimize fluid flow through the filter means and drainage of liquids such as those which result during aerosol removal.

A woven cotton scrim is typically employed. However, in cotton scrims, the fluid flow path is very tortuous in the plane of the web. This results in a higher pressure drop and a longer, less efficient fluid flow path with concomitant increased resistance to fluid flow and non-uniform fluid flow through the filter medium which detracts from filter efficiency.

Furthermore, woven materials inherently tend to "nest" when folded back upon themselves in the form of a pleated configuration. This is due to the "knuckles", that is, the raised portions of the material formed where one filament of the material crosses transversely over another filament, engaging recesses formed between knuckles. Because of the tendency of woven materials when folded over on themselves to nest, forming a two layer thickness less than twice the thickness of a single layer, the system suffers a further reduction in efficiency for pleated configurations.

Although the tortuous nature of the fluid flow path through woven cotton scrims may be reduced somewhat by increasing the spacing between adjacent filaments of the material, the efficiency of the filter means correspondingly decreases due to an increased tendency for the cotton scrim to nest. Furthermore, the nature of the cotton material often results in non-uniform spacing between the filaments with concomitant variations in fluid flow velocity and decreased fluid flow efficiency.

Additionally, the relatively widely spaced woven scrim is a less than optimum mechanical support structure for the filter medium since (a) the knuckles formed by weaving present high load contact points which can perforate the filter medium during manufacture or in rough handling, and (b) the large space between filaments may permit the filter medium to squeeze between filaments and through the scrim to thereby reduce the fluid flow efficiency.

Furthermore, cotton, under certain conditions of temperature and humidity is readily attacked by microorganisms such as molds and fungi. Such microorganisms ultimately tend to consume and weaken the cotton, thereby rendering it ineffective as a scrim material. In some instances, the presence of microorganisms, such as mildew, may be accompanied by undesirable dank odours produced by such microorganisms To eliminate such problems, fungicides have been applied to the cotton scrim material to deter attack However, in many instances, a fungicide may be somewhat specific and ineffective in controlling all fungi or molds capable of attacking cotton. Since the standard test used in assurance testing of filter canisters employs a single microorganism, full protection against all microorganisms cannot be assured when cotton scrims form part of the filter means. Furthermore, many fungicides may act as irritants to the mask wearer as well as the personnel manufacturing the mask.

To avoid problems with scrim materials altogether, various materials have been selected for or used in treatments applied to the filter medium which were considered to provide sufficient rigidity to render separate supporting layers unnecessary. Development in technology relating to self-support has also attempted to maintain the pleats in an open and uniformly spaced relationship to one another. Such attempts have included (1) impregnating the filter medium with a material to provide rigidity, and (2) the use of filter material having larger diameter filaments to increase bending modulus thereof. Both (1) and (2) have negative performance factors in the they reduce total material surface area and voids volume which is contrary to good filtration performance. Breathing gas filter canisters provided with such filter media suffer a further drawback in that it is generally difficult to precisely space and maintain the pleats in the desired uniformly-spaced relationship, typically 0.01 to 0.02 inch. The imprecise spacing produces uneven fluid flow distribution which increases fluid flow resistance that causes increased fluid velocity at certain locations and results ultimately in decreased filter efficiency. In addition, if extreme care is not used in handling the material, and in the use of completed filter canisters, the pleats may be deflected resulting in some pleats being pinched off, which produces increased fluid flow resistance and loss of filter efficiency.

According to the invention an improved breathing gas filter means for removing undesirable contaminants in particulate and aerosol form from a breathing gas, for use in a breathing gas filter assembly in conjunction with a gas mask, said filter assembly comprising a casing and said breathing gas filter means contained therein, wherein said breathing gas filter means is of a pleated web configuration, including a filter medium and scrim means defined by layers of material both at the upstream and downstream surfaces of the filter medium, the improvement wherein said scrim material is of a nonwoven microorganism resistant synthetic polymeric material to provide substantially continuous support for said filter medium and is of sufficient rigidity to maintain the pleats in substantially uniformly spaced relationship, to expedite fluid flow in the plane of the web and to minimize nesting of the filter medium.

The scrim layers sandwiching the porous filter medium are comprised of a microorganism-resistant, synthetic polymeric non-woven material These layers are both formed from first and second rows of filaments in which the filaments in each row are disposed parallel and in substantially uniformly spaced relationship to one another.

Preferably the peaks or apices and the troughs which define the fold lines of the pleats in the filter medium are arranged in parallel planes. The first and second rows of filaments are preferably arranged at an angle of about 90° to one another and in this pleated configuration are therefore oriented at an angle of about 42°–45° to the fold line of the parallel pleats.

In the drawing which illustrates the preferred embodiment of the invention,

Figure 1:
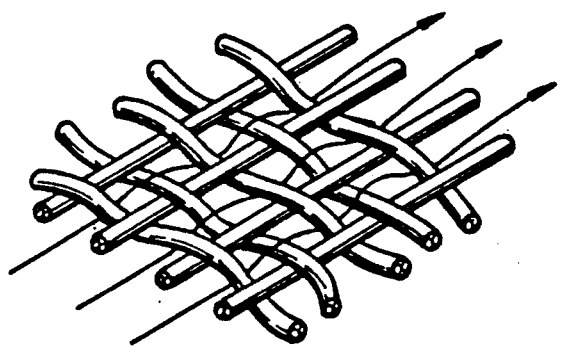
FIG. 1 illustrates the fluid flow path through a conventional woven cotton scrim.

With specific reference to the drawing, it is seen in FIG. 1, which illustrates a conventional woven scrim material, that the fluid flow path, as designated by the arrows is quite tortuous in the plane of the web. The advantage of using a nonwoven scrim material is evident from FIG. 2, wherein the fluid flow path, again illustrated by arrows, is illustrated. More specifically, the non-woven material used to form the upstream and downstream layers of the novel scrim means 10 according to the invention is made up of first and second rows of filaments 10a and 10b, respectively. The filaments of the first row 10a are arranged at an angle to the filaments of the second group 10b of about 90° to form a mesh or lattice structure. Within each group, the filaments are substantially uniformly spaced apart in parallel relationship.

The first and second rows of filaments 10a and 10b may also be designated as support filaments and drainage filaments, respectively, based upon their function and relative position with respect to the filter medium. Thus, the term "support filaments" refers to those filaments adjacent to the filter medium which serve to support the filter medium. The term "drainage filaments" refers to those filaments which are joined to the support filaments and are on the outside facing away from the filter medium.

Preferably, the diameter of the support and drainage filaments is about the same; and the thickness of the support and drainage layers is about 0.017 to 0.023 inches.

Figure 3:
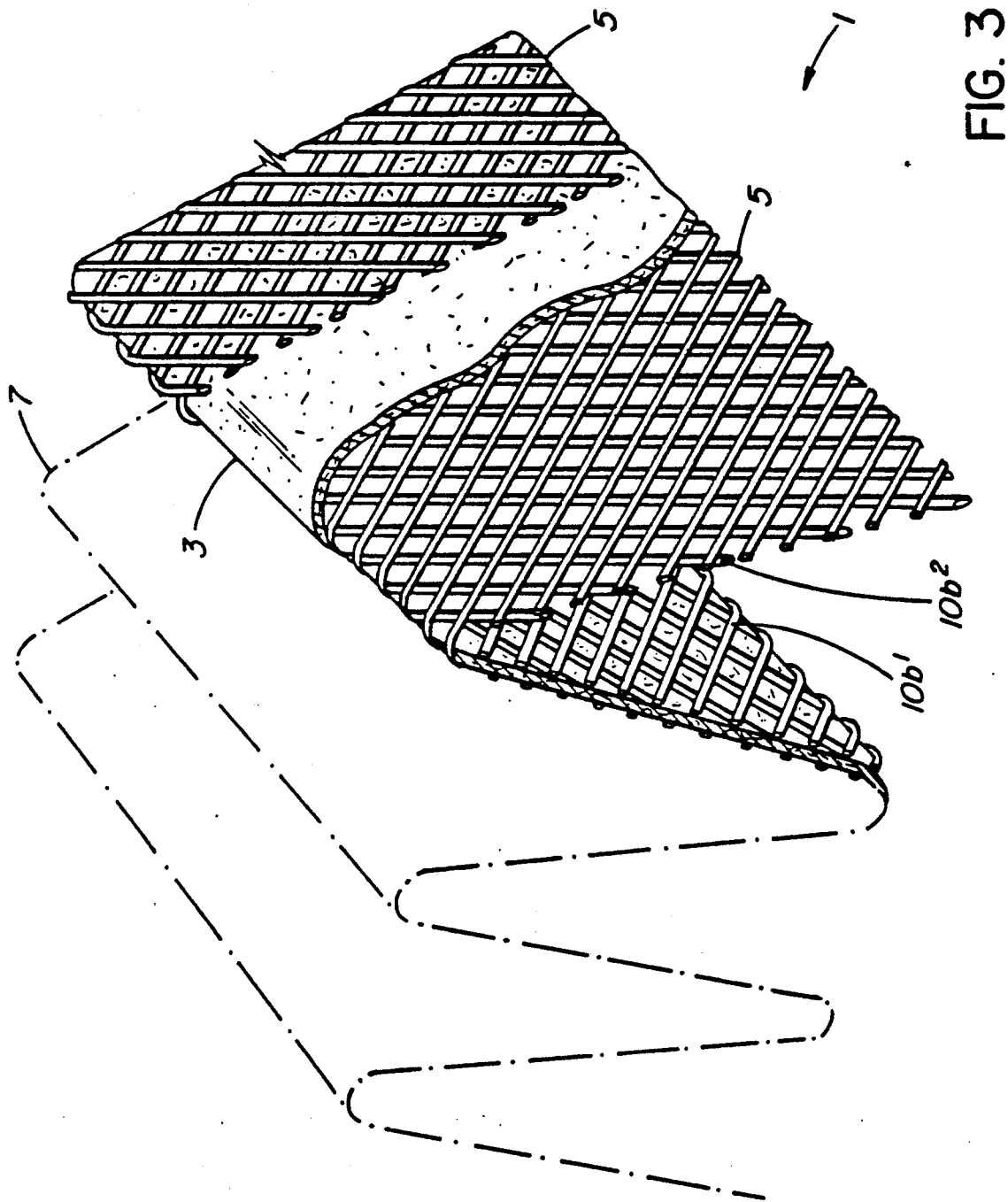
FIG. 3 is a perspective view partially cur away to show the three layer construction of the filter means of the present invention.

Adjacent drainage filaments are disposed closely to one another and may contact one another in a non-nesting manner in the pleated configuration to form the main fluid flow paths. Thus, as shown in FIG. 3, drainage filaments 10b' on one pleat lie (facing) opposite and transverse with respect to drainage filaments on an adjacent facing pleat 10b². When the filter medium is tightly corrugated to provide closely spaced pleats, the drainage filaments of one pleat may contact the drainage filaments of an adjacent pleat. For example, as is common in a filter canister of a gas mask in which the particulate and aerosol filter assembly is planar, the pleats are parallel and in substantially coextensive contact with each other such that there is extensive drainage filament-to-drainage filament contact.

As seen in FIG. 3, the filter means is designated generally by reference numeral 1. The filter means includes a filter medium 3 disposed between support and drainage layers 5. The support and drainage layers comprise the scrim means. The filter means is arranged in a pleated configuration.

In the preferred embodiment, the peaks or apices and the troughs which define the fold lines 7 of the pleats are arranged in the direction of the fluid flow path, that is in axial orientation with respect thereto. More specifically, the upstream apices and downstream apices of the pleats each define a plane, the two planes being substantially parallel to one another.

The filter medium 3 may be formed from any material which is inert to gases, liquids and solids typically encountered in chemical and biological warfare and which is capable of undergoing processing, such as corrugation, without adverse effects.

The filter medium can be any suitably porous medium, e.g. a microporous polymeric membrane such as polytetrafluoroethelene or Nylon®66. A variety of microfibrous media are also suitable for use in the filter medium 3, including a microfibrous glass fibre filter medium with uniform pores, a microfibrous glass fibre filter medium with graduated pores, e.g. having an upstream layer with larger pores which serve as a course filter and a downstream layer with smaller pores which serves as a finer filter, or a filter medium comprising the combination of a microfibrous glass fibre layer upstream from a microfibrous electret (i.e. a microfibrous material capable of maintaining a static electric charge) The fibre filter media may include a suitable binder and may be treated to be both hydrophobic and oleophobic, i.e. to resist wetting by water and oil-based compositions, respectively, and thereby resist plugging and clogging by water and oil aerosols For example, a fluorochemical treatment, similar to that described in U.S. Pat. No. 4,508,775 to Joseph G. Adiletta for Gas Permeable Composite Structures, may be applied to the glass fibres.

Other examples of suitable materials include glass, polyethylene, polyvinyl chloride, vinyon fibres (vinyon is a generic name for a manufactured fibre in which the fibre-forming substance is any long chain synthetic polymer composed of at least 85% of vinyl chloride units), and combinations thereof. The filter medium may also include a water repellant such as a silane, for example, an alkylrrihalosilane and, particularly, methyltrichlorosilane, and a mildewcide such as Yancid®. A preferred filter medium is formed, by weight, of 40% glass fibres and 60% vinyon fibres. The composition also contains about 1 to about 5%, by weight, based on the total weight of vinyon and glass fibres of methyltrichlorosilane and Vancide®.

Materials which may be suitably used for the scrim layers 5 of the present invention are inert to microorganisms, such as fungi and molds, of the type which attack cotton scrims. Preferably, such materials are also inert to other microorganisms and chemical reagents which may be used to chemical and biological warfare. In addition, the materials used to form the scrim layers are preferably easily extruded to form filaments of the dimensions preferred in the present invention and easily assembled to form the scrim layers of the present invention. Such materials are preferably thermoplastic Examples of preferred materials include polyolefins, such as polyethylene and polypropylene, preferably the latter.

Figure 2:
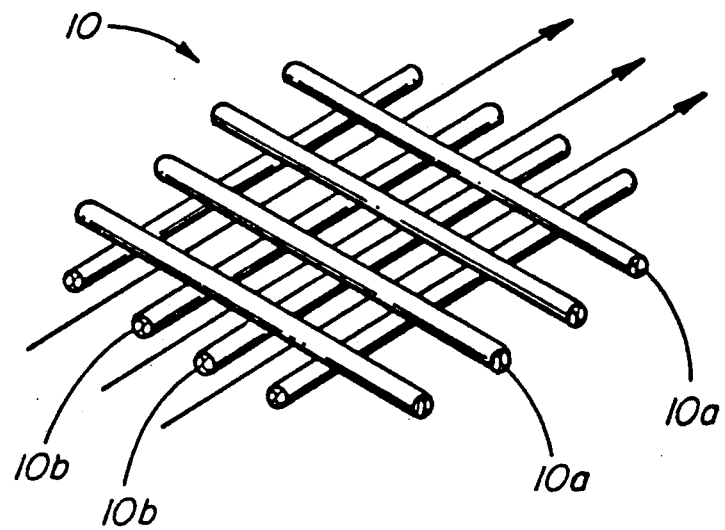
FIG. 2 illustrates a fluid flow path along a lattice structure of the type used in a scrim according to the present invention.

As indicated by the arrows in FIG. 2, fluid flow occurs to a major extent between and parallel to the drainage filaments 10b as well as parallel to the surface of the adjacent filter medium. In part this is due to the uniformly spaced relationship of the filaments in the present invention, maintained by the heat fused or welded contact points where support filaments cross drainage filaments in addition, as noted above, because of the structure, the materials used, and the orientation and contact of the drainage filaments, the support and drainage material of the present invention shows little or no tendency to nest.

Efficiency is further enhanced in the present invention by the support filament spacing which prevents deflection or extrusion of the relatively compressible filter medium between the support filaments. This assists in maintaining fluid flow space between and parallel to drainage filaments and also prevents overstressing of the filter medium during manufacture or use. Preferably, the spacing of adjacent filaments in the support and drainage layers is about the same. The preferred range of filament spacings is defined as about 15.5 to 17.5 strands per inch.

In addition to minimizing fluid flow resistance caused by cross filaments in the direct fluid flow path, such as in the woven cotton scrim of FIG. 1, the parallel arrangement of support filaments of the present invention allows relatively unhindered fluid flow path and also provides continuous support to the filter medium. Unlike the stressful point contacts associated with woven mesh such as scrim, which may cause damage to the filter medium during production and/or service, the support filaments of the scrim layers of the present invention provide continuous support over a greater surface area of the filter medium.

Figure 4:
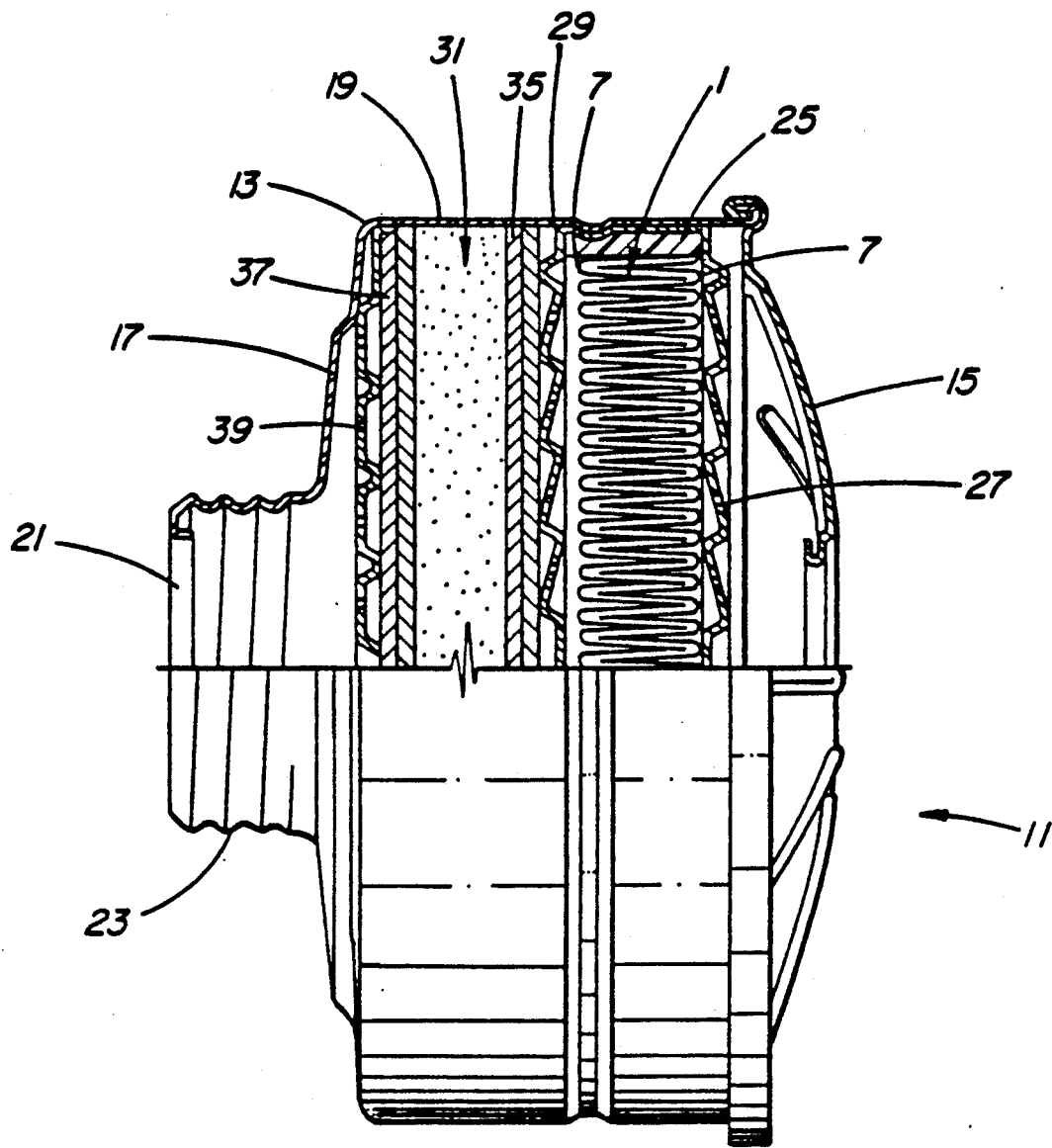
FIG. 4 illustrates an embodiment of a filter canister including a filter means according ro the present invention adapted for use with a face mask.

FIG. 4 shows in section a preferred embodiment of the filter means according to the present invention disposed in a conventional filter canister The canister, designated generally by reference numeral 11, includes a casing 13 formed from either a plastic or metal material, preferably aluminum. The casing is preferably non-conductive and, when manufactured from metal, should be coated on the exterior surface to render it essentially non-conductive. The casing which is preferably cylindrical, includes a front wall 15, a rear wall 17, and a cylindrical side wall 19. The rear wall, which is on the downstream side of the canister, includes a means of attachment to the face mask which typically takes the form of a cylindrical protrusion 21 having external threads 23 which allow the canister 11 to be threaded into a commensurate fitting in the face mask (not shown). Alternate means of attachment, such as a bayonet fitting or the like, may be employed. Both the rear portion of the cylindrical protrusion 21, which is received in the face mask, and the front wall 15 include apertures to permit ingress and egress of gases. The apertures (not shown) ar generally evenly distributed over the surface.

The pleated filter means 1 according to the invention for removing particulates and aerosols from the breathing gas is located within the housing and is sealingly retained by edge seal 25 (formed from a polyurethane material). It is also maintained in place by perforated retainers 27 and 29 arranged on the upstream and downstream sides, respectively, of the filter means 1. These retainers, and particularly the upstream retainer 27 restrain the porous means and protect it from damage occurring by mechanical intrusion through the inlet apertures (not shown).

A sorbent bed (second) filter means 31 is disposed within the housing downstream from the particulate/aerosol filter assembly 1. To efficiently remove vaporous chemical contaminants the sorbent bed filter assembly 31 typically includes a compressively-loaded bed of activated carbon particles, preferably of a size of about $12 \times 30$ mesh U.S. Sieve Series. However, the bed could be fashioned from any suitable sorbent material of suitable particle size, i.e. a material which absorbs or adsorbs the vaporous chemical contaminants, such as activated alumina, ion exchange resins, or molecular sieves.

Immediately adjacent and located upstream and downstream of the second filter means 31, are included fines filters 35 and 37. A perforated retainer plate 39 is placed in contact with the fines filter 37 on the downstream side of the sorbent bed 31.

While the invention is susceptible to various modifications and alternative forms, certain specific embodiments thereof are described in the examples set forth below. It should be understood, however, that these examples are not intended to limit the invention to the particular forms disclosed but, on the contrary, the intention is to cover all modifications, equivalents, and alternatives falling within the spirit and scope of this invention.

EXAMPLE 1—PREPARATION OF POROUS FILTER MEANS

Rolls of porous filter medium and scrim material were arranged in front of a corrugator device so that one layer of filter medium paper was supplied to the corrugator device interposed between two layers of scrim material. The filter medium paper was comprised, by weight, of 40% of type 475 glass fibres and 60% vinyon (H. H. regular, 3 denier by 6.35 mm long. The medium also contains about 1 to 5%, by weight, based on the total weight of vinyon and glass fibres, of methyltrichlorosilane (Dow Corning, Z1211), and Yancide ® (89 - R.T. vanderbilt). The filter medium was supplied in a thickness of about 0.35 mm. The scrim material was supplied in 24 inch wide rolls of polypropylene mesh in which both the support and drainage filaments were parallel and spaced from one another to provide about 16 filaments per inch. Each of the filaments had a diameter of about 0.010 inches. The corrugator was adjusted to provide a pleat height (distance between adjacent fold lines) of about 0.56 inches. After passing through the corrugator device, the pleated porous means (particulate filter) was passed between two heated plates at a temperature just below the melting point of the synthetic polymeric non-woven support and drainage material (polypropylene), i.e. 200° to 235° F. The pleated porous means (particulate filter) had a pleat arrangement of 11 pleats per inch.

EXAMPLE 2-PREPARATION OF AN EDGE-SEALED PARTICULATE FILTER ASSEMBLY

A portion of filter means or particulate filter prepared in Example 1, having dimensions of 24 inches $\times$ 60 inches, was cut and placed into a frame which maintained the number of pleats at eleven pleats per inch. The frame was then placed onto a manipulator provided with a series of jet nozzles capable of supplying water jets at 55,000 psi. Several particulate filters were cut from the pleated material in the frame with the water jets. The filters were placed into particulate filter retainers which were then transferred to spin molds. Polyurethane was introduced to the retainers as they were rotated at a speed of about 1,500 to about 3,000 RPM. The polyurethane formed a seal between the peripheral circumference of the filter and the inner surface of the retainer wall. Spinning was continued until the urethane cured.

The embodiments of the invention in which an exclusive property or privilege is claimed are defined as follows:

1. In a breathing gas filter assembly for use with a gas mask, said filter assembly comprising a casing and a breathing gas filter means contained therein for removing undesirable contaminants in particulate and aerosol form from said breathing gas, wherein said breathing gas filter means is of a pleated web configuration, including a filter medium and scrim means defined by layers of material both at the upstream and downstream surfaces of the filter medium, the improvement wherein said scrim means is of a non-woven microorganism resistant synthetic polymeric material to provide substantially continuous support for said filter medium and is of sufficient rigidity to maintain the pleats in substantially uniformly spaced relationship, to expedite fluid flow in the plane of the web and to minimize nesting of the filter medium.

2. A breathing gas filter assembly according to claim 1, wherein said scrim material is formed from first and second rows of filaments, the rows of filaments being heat sealed together, such that the filaments in each row are disposed parallel and in substantially uniformly spaced relationship to one another.

3. A breathing gas filter assembly according to claim 2, wherein the filaments in the first row are arranged at about 90° to the filaments in the second row.

4. A breathing gas filter assembly according to claim 3, wherein the peaks and troughs which define fold lines of the pleats of said breathing gas filter means are arranged in parallel planes.

5. A breathing gas filter assembly according to claim 4, wherein the first and second rows of filaments are oriented at an angle of about 42° to 45° to the fold lines of the pleats.

6. A breathing gas filter assembly according to claim 5, wherein the diameter of the filaments in each of the first and second rows is about the same.

7. A breathing gas filter assembly according to claim 6, wherein the spacing of adjacent filaments in the first and second rows is about the same.

8. A breathing gas filter assembly according to claim 7, wherein the filaments in each of the first and second rows are arranged at spacings of about 15.5 to 17.5 strands per inch.

9. A breathing gas filter assembly according to claim 8, wherein the filter medium comprises, by weight, of 40% glass fibres and 60% vinyon fibres.

10. A breathing gas filter assembly according to claim 9, wherein the synthetic polymeric material is a thermoplastic material.

11. A breathing gas filter assembly according to claim 10, wherein the thermoplastic material is a polyolefin.

12. A breathing gas filter assembly according to claim 11, wherein the polyolefin is polypropylene.

* * * * *